United States Patent [19]

Ries

[11] 3,950,495
[45] Apr. 13, 1976

[54] METHOD FOR THE CONTINUOUS PREPARATION OF STABLE AQUEOUS AMMONIUM POLYPHOSPHATE COMPOSITIONS
[75] Inventor: Alvin William Ries, Highland, Ind.
[73] Assignee: Standard Oil Company, Chicago, Ill.
[22] Filed: Dec. 21, 1973
[21] Appl. No.: 427,043

[52] U.S. Cl. .................................. 423/306; 71/43
[51] Int. Cl.$^2$ .................. C01B 15/16; C01B 25/26
[58] Field of Search ........................... 423/305–313; 71/43

[56] References Cited
UNITED STATES PATENTS

| | | | |
|---|---|---|---|
| 3,044,851 | 7/1962 | Young | 423/312 |
| 3,459,499 | 8/1969 | Mullen | 423/313 |
| 3,464,808 | 9/1969 | Kearns | 423/305 |
| 3,503,706 | 3/1970 | Legal | 423/305 |
| 3,695,835 | 10/1972 | Kearns | 423/310 |
| 3,730,700 | 5/1973 | Groenveld | 423/310 |
| 3,733,191 | 5/1973 | Meline et al. | 423/305 |
| 3,734,708 | 5/1973 | Burns | 423/310 |
| 3,775,534 | 11/1973 | Meline | 423/310 |

OTHER PUBLICATIONS
Pipe Reactor in Production of Liquid with Very High Polyphosphate Content Fortelzsibleutons 1972.

*Primary Examiner*—Oscar R. Vertiz
*Assistant Examiner*—Gregory A. Heller
*Attorney, Agent, or Firm*—James R. Henes; Arthur G. Gilkes; William T. McClain

[57] ABSTRACT

An improved method for the continuous production of stable aqueous ammonium polyphosphate compositions which are useful as fertilizers and fire retardants. Wet-process superphosphoric acid which is primarily in the orthophosphate form and anhydrous ammonia vapor are combined in a pipe reactor wherein the exothermic ammoniation of the acid and the conversion of a portion of the orthophosphate to polyphosphate caused by the heat liberated in the exothermic ammoniation reaction occur. A stream of the acid is introduced into the interior of a stream of ammonia vapor in the pipe reactor in order to avoid corrosion of the pipe reactor.

Water is added to the reaction mixture to quench the conversion reaction and to provide the amount of water that is required in the desired final composition. The resulting stream is combined with a cooler stream of the desired final stable aqueous ammonium polyphosphate wherein the polyphosphate is cooled and the ammoniation is completed rapidly.

6 Claims, 2 Drawing Figures

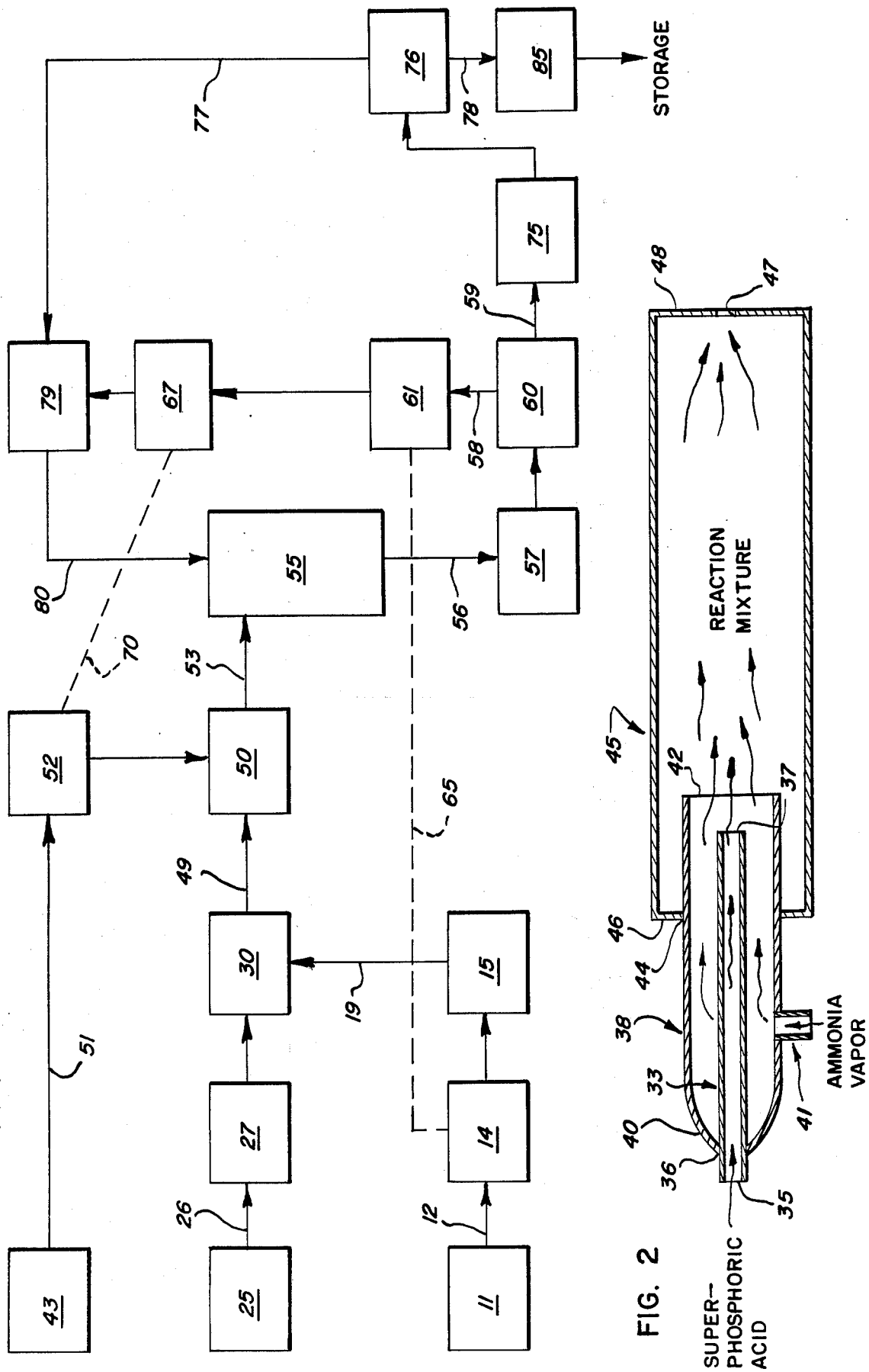

METHOD FOR THE CONTINUOUS PREPARATION OF STABLE AQUEOUS AMMONIUM POLYPHOSPHATE COMPOSITIONS

BACKGROUND OF THE INVENTION

1. Field of the Invention

This invention relates to an improved method for the continuous production of stable aqueous ammonium polyphosphate compositions.

2. Description of the Prior Art

Various methods for the continuous production of stable aqueous ammonium polyphosphate compositions by the reaction of ammonia and wet-process superphosphoric acid are well known in the art. A most effective technique is disclosed in Mullen, U.S. Pat. No. 3,459,499 (1969), whose discussion of the state of the art is incorporated herein by reference. Mullen's method is a continuous process for forming an aqueous ammonium phosphate composition stabilized by the presence of polyphosphate ions, comprising the steps of continuously passing through an endless path preformed ammonium phosphate composition containing polyphosphate ions, continuously adding to this stream at different points predetermined amounts of first the aqueous ammonia and then at a point downstream superphosphoric acid containing a sufficient amount of polyphosphate ions to stabilize the product and creating a turbulence in the stream, whereby the aqueous ammonia and acid react to form a new quantity of the aqueous ammonium phosphate composition, and withdrawing downstream from the points of addition of the aqueous ammonia and superphosphoric acid a portion of the aqueous ammonium phosphate composition.

Being performed in a closed system with control of environmental conditions and constituent characteristics, Mullen's method minimized the prior art problems of the loss of ammonia by vaporization, the loss of polyphosphate forms by hydrolysis, and the formation of the less soluble mono-ammonium and di-ammonium phosphates. Further, Mullen's method provided temperature control within the system and maintenance of suitable concentrations of constituents and properly mixed pH controlled neutralizations.

However, Mullen's method required a complex mixing system for adding the ammonia and superphosphoric acid to the stream of preformed ammonium phosphate composition at different points, with the ammonia being added to the stream in advance of the superphosphoric acid.

An additional problem is presented by the expense and difficulty of obtaining high conversion wet-process superphosphoric acid, that is, acid containing sufficient polyphosphate to sequester metal impurities in the final aqueous ammonium polyphosphate compositions and to produce a stable composition. Thus, in addition to reacting superphosphoric acid with ammonia and preserving the polyphosphate initially present in the acid feed, it is necessary to convert a portion of the orthophosphate to polyphosphate so that sufficient polyphosphate is available to sequester any metal impurities which may be present in the finished composition.

Pipe reactors are a well-known means for converting orthophosphate to polyphosphate. Wet-process superphosphoric acid and ammonia are introduced into the pipe reactor for reaction therein, and a reaction mixture containing the desired amount of polyphosphate is discharged from the pipe reactor.

However, there are problems associated with the use of pipe reactors in prior art methods for the continuous manufacture of stable aqueous ammonium polyphosphate compositions. Achieving the desired extent of conversion of orthophosphate to polyphosphate within the short residence time of the reaction mixture in the pipe reactor generally requires either the addition of external heat or the generation of sufficient heat by the exothermic reaction between the superphosphoric acid and ammonia. The latter method additionally necessitates efficient mixing of the acid and ammonia within the pipe reactor. Both methods are problematical because pipe reactors are subject to the severe corrosive effects of superphosphoric acid at elevated temperatures. Further, recovery of the product in its desired finished form often necessitates treatment of the reaction mixture subsequent to its discharge from the pipe reactor. Such treatment often involves the addition of reactant or the separation of unreacted ammonia and other volatiles from the ammonium polyphosphate. The prior art methods have taken a large number of approaches to solve these problems.

For example, Kearns, U.S. Pat. No. 3,464,808 (1969) discloses a method wherein an ammonia stream is introduced into the center of an outer concentric stream of superphosphoric acid in a pipe reactor. In order to prevent a buildup of solids in the pipe reactor, a centrifugal motion is imparted to the acid prior to the contact with ammonia so that the acid surrounds the ammonia stream. Stream and other gases are permitted to escape when the melt product is quenched by being impelled through a gaseous medium upon exiting from the pipe reactor. Additional ammonia is added to neutralize the melt after it is dissolved in an aqueous solution. Alternately, quenching of the melt can be effected by feeding the melt directly into the aqueous solution. However, the second method of quenching requires more cooling than the first method because the steam produced by the conversion of orthophosphate to polyphosphate recondenses in the cooled solution.

A modification of this approach is found in the patent to Kearns U.S. Pat. No. 3,695,835 (1972) which disclosed a method wherein mixing is effected in the same manner as in U.S. Pat. No. 3,464,808. However, after mixing, ammonium phosphate is formed in one step, and then the ammonium phosphate is subjected to hot gases in a second separate step to raise the temperature whereby a portion of the ammonium phosphate is converted to ammonium polyphosphate. Quenching of the ammonium polyphosphate melt is effected as in U.S. Pat. No. 3,464,808.

Legal, U.S. Pat. No. 3,503,706 (1970) disclosed another method wherein ammonia is introduced into a stream of superphosphoric acid in a pipe reactor, and a melt is produced. Free water and gaseous phase are separated from the melt by passing the melt from the pipe reactor into a chamber wherein the melt is agitated and dissolved. Then additional ammonia is added to the solution to adjust its pH and ammonia content to the level desired in the ammonium polyphosphate composition.

Meline, U.S. Pat. No. 3,775,534 (1973) was filed Nov. 15, 1971 and was assigned to the Tennessee Valley Authority. This patent discloses a method for producing liquid fertilizer solutions whereby wet-process superphosphoric acid and ammonia are combined in a pipe reactor and the resulting melt is fed to a solution reactor vessel or reaction tank containing the final desired liquid fertilizer solution. Neutralization of a portion of the acid and conversion of a portion of the orthophosphate to polyphosphate occur in the pipe reactor. The conversion reaction is quenched when the hot melt exiting from the pipe reaction is introduced into the cooler liquid fertilizer solution in the solution reactor vessel. The neutralization is completed in the solution reactor vessel. The method teaches that additional ammonia is introduced into the liquid fertilizer solution in the solution reactor vessel, if less than one hundred percent of that required is fed to the pipe reactor. Alternately, the melt can be quenched by cooling it to about ambient temperature whereby the melt is solidified into a friable solid. The soluble reactor vessel is apparently open to the atmosphere with the resulting danger of losses due to evaporation. The patent does not disclose a way of avoiding corrosion of the pipe reactor or the manner in which the acid and ammonia are combined in the pipe reactor.

The publication "Use of a Pipe Reactor in Production of Liquid Fertilizers with Very High Polyphosphate Content" in Solutions, March-April, 1972, pp. 32–45, by R. S. Meline, R. G. Lee, and W. C. Scott, all of the Tennessee Valley Authority discloses a method wherein an ammonia stream is introduced into the center of an outer concentric stream of superphosphoric acid in a pipe reactor and the melt produced is passed from the pipe reactor to a conventional liquid fertilizer reaction tank where it is dissolved in an aqueous solution. Water and additional ammonia are added to the solution in the tank, and the solution is stirred and cooled. The authors reported that some of the polyphosphate in the melt was lost during dissolution in the reaction tank because of hydrolysis, unless the temperature of the liquid fertilizer was kept below 150°F. in the tank. The authors pointed out that an insoluble scale formed in the pipe reactor and eventually plugged the pipe reactor and that a means for controlling its rate of formation was needed. They indicated that cooling the pipe reactor by water jacketing might substantially reduce the rate of scale formation.

The report "New Developments in Fertilizer Technology" presented by the Tennessee Valley Authority on Oct. 17–18, 1972 at the National Fertilizer Development Center in Muscle Shoals, Ala., discloses a method wherein an ammonia stream is introduced into the center of an outer concentric stream of superphosphoric acid in a pipe reactor and the melt produced is passed from the pipe reactor to a recycle stream of the desired final liquid fertilizer. The report indicated that when all of the ammonia to be added was fed to the pipe reactor, there was a decrease in the polyphosphate content of the product. Consequently, only a portion of the ammonia required is fed to the pipe reactor, and the remainder is fed to the recycle stream downstream from the pipe reactor. Water is also added to the recycle stream at this point. Use of a water jacket to cool the walls of the pipe reactor prevented corrosion and retarded the buildup of scale on the walls of the pipe reactor. However, the report indicated that cooling the pipe reactor caused a decrease in the polyphosphate content of the product.

Groenveld, U.S. Pat. No. 3,730,700 (1973) discloses a method wherein a stream of wet-process superphosphoric acid is introduced into the center of a stream of ammonia in a pipe reactor at carefully controlled linear velocities and the streams are accelerated through a first reactor zone of the reactor. The velocity of the ammonia, calculated at its point of entrance to the reactor, must be more than 100 feet per second, otherwise solid deposits form on the walls of the pipe reactor. On leaving the pipe reactor, the reaction mixture is discharged through a restricted opening, and the pressure is reduced so that the gaseous impurities and moisture present in the reaction mixture are removed by flash evaporation.

Meline et al. U.S. Pat. No. 3,733,191 (1973) discloses a method wherein ammoniation of wet-process superphosphoric acid occurs in two reactors, only the second of which is a pipe reactor. The ammonia is introduced into an acidic medium in the pipe reactor, and the product exiting from the pipe reactor, after a relatively long residence time of from 15 seconds to 1 minute, is fed into a foam disengager which is maintained under negative pressure and wherein foam and water vapor are separated from the melt product.

Finally, Burns, U.S. Pat. No. 3,734,708 (1973) discloses a method wherein an ammonia stream moving at a velocity of at least 500 feet per second and an acid stream are introduced into a mixing zone from opposite directions, the mixed acid and ammonia are conveyed through a U-shaped reaction zone for from 0.10 to 0.18 seconds, steam is removed from the ammonium polyphosphate product, and air is drawn through the steam-free product to cool it. Additionally, in Burns' method it may be necessary to introduce ammonia into the product to adjust its pH and ammonia content to the level desired in the ammonium polyphosphate composition.

Contrary to prior art methods, it has been found that corrosion of the pipe reactor can be minimized without the use of a water-jacket to cool the pipe reactor as in the Tennessee Valley Authority report and without imparting a centrifugal motion to the acid as in the Kearns patents, but instead by the introduction of a stream of the acid into the center of a stream of ammonia and away from the walls of the pipe reactor. Groenveld discloses a similar method of introducing the reactants but requires that the streams of acids and ammonia be accelerated as they flow through the pipe reactor. On the contrary, in the method of this invention, the velocity of the combined streams of the acid and ammonia in the pipe reactor is reduced in order to achieve efficient mixing of the streams within the pipe reactor. The amounts of the acid and ammonia required in the analysis desired for the final ammonium polyphosphate composition are added in a single step and by means of a simple flow system, and the reactions are completed within a few seconds after the reactants are introduced into the pipe reactor. Further, this method has the advantages of the method of Mullen, U.S. Pat. No. 3,459,499 (1969). It employs a closed system and provides temperature control and maintenance of suitable concentrations of constituents and properly mixed pH controlled neutralizations. It does not employ a tank reactor. No losses of ammonia by volatilization or of polyphosphate by hydrolysis occur, and no separations are required.

SUMMARY OF THE INVENTION

An improved method for the continuous production of stable aqueous ammonium polyphosphate compositions, which are useful as fertilizers and fire retardants, comprises reacting in a pipe reactor a stream of wet-process superphosphoric acid, which is primarily in the orthophosphate form, and a stream of anhydrous ammonia vapor under pressure in an exothermic ammoniation whereby a portion of the orthophosphate is dehydrated and converted to polyphosphate in the pipe reactor by means of the heat generated by the exothermic ammoniation reaction; quenching the conversion reaction by removing the hot reaction mixture stream and adding to it a stream of cooler water, which water is at such temperature as to lower the temperature of the reaction mixture enough to quench the conversion reaction; and which water is added in the amount that is required in the analysis desired for the final stable aqueous ammonium polyphosphate composition; and completing rapidly the ammoniation reaction and the conversion of the reaction mixture stream to a reaction product stream in a reaction medium formed by combining the reaction mixture stream and a cooler stream of the desired final stable aqueous ammonium polyphosphate, which cooler stream is at such temperature as to lower the temperature of the reaction mixture below that at which loss of polyphosphate due to hydrolysis is significant.

The step of reacting the acid and ammonia in the pipe reactor comprises introducing in a single step a stream of the acid into the center of a stream of the ammonia in the pipe reactor in order to prevent corrosion of the pipe reactor by minimizing the contact of the pipe reactor walls with the acid heated by the heat evolved in the ammoniation, which streams of the acid and of the ammonia contain the amounts of the acid and of the ammonia, respectively, that are required in the analysis desired for the final stable aqueous ammonium polyphosphate composition; reducing the linear velocity of the combined streams in the pipe reactor after they are combined in order to achieve efficient mixing of the combined streams within the pipe reactor and to form the reaction mixture; and allowing the temperature of the reaction mixture in the pipe reactor to increase in response to the heat liberated by the ammoniation reaction and without the addition or removal of heat by external means, and thereby effecting the partial conversion of orthophosphate to polyphosphate.

The step of reacting the acid and ammonia in the pipe reactor preferably comprises additionally introducing the acid into the pipe reactor at a constant flow rate; introducing the ammonia into the pipe reactor at an adjustable flow rate; measuring the pH of the reaction product stream; and adjusting the flow rate of ammonia in a predetermined relation to the pH of the reaction product stream and the desired final composition requirements.

The step of quenching the conversion reaction preferably comprises additionally introducing the water at an adjustable flow rate; measuring the specific gravity of the reaction product stream; and adjusting the flow rate of water in a predetermined relation to the specific gravity of the reaction product stream and the desired final composition requirements.

The method preferably comprises the additional steps of cooling the reaction product stream; transferring a portion of the reaction product stream to storage, which portion corresponds in flow rate to that of the quenched reaction mixture stream which is continuously being combined with the cooler stream of the desired final stable aqueous ammonium polyphosphate; and transferring the remainder of the reaction product stream to a recycle stream and using it as the cooler stream of the desired final stable aqueous ammonium polyphosphate which is combined with the quenched reaction mixture stream.

When the wet-process superphosphoric acid introduced into the pipe reactor of this invention contains at least 60% $P_2O_5$ by weight, sufficient orthophosphate is converted into polyphosphate by the method of this invention so that at least 50 percent of the $P_2O_5$ content of the final aqueous ammonium polyphosphate composition is in the polyphosphate form, and a stable aqueous ammonium polyphosphate composition is formed.

BRIEF DESCRIPTION OF THE DRAWINGS

The accompanying drawings illustrate the preferred embodiment of this invention. However, it is understood that the specific details of the system used may vary without departing from the basic principles of the invention herein:

FIG. 1 is a schematic diagram of the system used in the method of this invention for continuously ammoniating wet-process superphosphoric acid and partially converting the orthophosphate therein to polyphosphate; and FIG. 2 is a schematic diagram of a section along the longitudinal axis of the pipe reactor of this invention for continuously mixing and pre-reacting the acid and ammonia and converting a portion of the orthophosphate in the acid to polyphosphate.

DETAILED DESCRIPTION OF THE INVENTION

In operation, in the system shown in FIG. 1, anhydrous liquid ammonia stored under pressure in tank 11 at a temperature of about 60°F. is fed by metering pump 14 via conduit 12 to heat exchanger 15 wherein the ammonia is heated to a temperature in the range from about 100°F. to about 220°F. and is vaporized. The vapor is then transported via conduit 19 to pipe reactor 30 which is shown in detail in FIG. 2 and is discussed below. The ammonia vapor is maintained in conduit 19 at a pressure in the range from about 40 pounds per square inch to about 220 pounds per square inch depending on the temperature of the vapor and is typically 115 pounds per square inch at a vapor temperature of 190°F.

Use of ammonia in the vapor state aids in the mixing of the acid and ammonia, which is necessary to effect sufficient pre-reaction of the acid and ammonia in order to generate the heat needed for conversion of orthophosphate to polyphosphate. Further, since ammonia vapor is introduced to pipe reactor 30 rather than liquid ammonia, heat generated by the ammoniation will not be dissipated in pipe reactor 30 by the vaporization of ammonia. Thus, all the heat generated by the reaction of the acid and ammonia in pipe reactor 30 is utilized for the molecular dehydration of orthophosphate.

Wet-process superphosphoric acid, whose $P_2O_5$ content is at least 60 percent and up to about 72 percent by weight and which exists primarily in the orthophosphate form, is stored in tank 25 at a temperature between 100°F. and 250°F., and typically 140°F., and is fed by pump 27 at a predetermined constant rate into pipe reactor 30 via conduit 26.

Typical compositions of the acid and ammonia feeds are shown in Table I. The viscosity of the acid is typically in the range of from 900 to 2,300 s.s.u. at 100°F. Approximately from 10 to 35 percent of the $P_2O_5$ content in the acid feed is in the polyphosphate form.

TABLE I

| Component | Composition of Wet-Process Superphosphoric Acid Percent by Weight |
|---|---|
| $P_2O_5$ | 65–69 |
| $Fe_2O_3$ | 1.9–2.2 |
| $Al_2O_3$ | 0.9–1.1 |
| MgO | 0.3–0.5 |
| F | 0.2–0.4 |
| $SO_4$ | 5 |
| C | 0.1 |
| Solids[1] | 0.3–2 |

[1]Solids insoluble in dioxane

Anhydrous ammonia vapor and wet-process superphosphoric acid are mixed and pre-reacted in pipe reactor 30 wherein partial ammoniation of the acid and partial conversion of the orthophosphate in the acid to polyphosphate occur. The ammoniation of wet-process superphosphoric acid is an exothermic reaction, and the heat of reaction generated in the ammoniation reaction raises the temperature of the reaction mixture in pipe reactor 30 to between 550°F. and 700°F. and typicaly 650°F. The heat of reaction alone is sufficient to cause molecular dehydration and conversion of a portion of the orthophosphate in the acid to polyphosphate. No external temperature control of pipe reactor 30 is necessary.

The acid and ammonia are mixed in pipe reactor 30 in amounts which have previously been determined in accordance with the analysis desired for the final stable aqueous ammonium polyphosphate composition. The relative amounts of the components necessary to produce final stable aqueous ammonium polyphosphate compositions having various N—P—K (nitrogen as N, phosphorus as $P_2O_5$, and potassium as $K_2O$) analyses are shown in Table II.

Water is stored in tank 43 at a temperature depending primarily on its source and typically at about 50°F. and is transferred by metering pump 52 to mixing tee 50 via conduit 51.

The reaction mixture exiting from pipe reactor 30 via conduit 49, which is actually a series of concentric reducing and expanding sections, enters mixing tee 50 wherein the amount of water that is required in the analysis desired for the final stable aqueous ammonium polyphosphate composition is added to the reaction mixture. The added water is at a lower temperature than the reaction mixture exiting from pipe reactor 30 and lowers the temperature of the reaction mixture from about 650°F. to about 290°F. and thus quenches the conversion reaction.

TABLE II

| N-P-K Analysis | Parts by Weight of Constituents in a Typical Feed | | |
|---|---|---|---|
| | Ammonia | Wet-Process Superphosphoric Acid | Water |
| 10-34-0 | 1.0 | 4.0 | 3.20 |
| 11-37-0 | 1.0 | 3.95 | 2.50 |
| 12-40-0 | 1.0 | 3.92 | 1.92 |

The reaction mixture exiting from mixing tee 50 via conduit 53 enters reactor 55 where it combines with a turbulantly flowing recycle stream in conduit 80 which is made up of the desired final stable aqueous ammonium polyphosphate composition. The recycle stream serves as a reaction medium of the completion within mixer 55 of the ammoniation reaction between the ammonia and acid. The recycle stream also serves as a coolant to lower the temperature of the reaction mixture exiting from mixing tee 50 below that at which loss of polyphosphate due to hydrolysis is significant.

Preferentially mixer 55 has a tubular body with an influent end and an effluent end and a plurality of unobstructed sections or stages separated by mixing means having a plurality of openings. The mixing means may be perforated plates disposed along the longitudinal axis of the tubular reactor and disposed generally perpendicular thereto, and between said influent and effluent ends, and located at the commencement of each reaction stage, for establishing turbulence in each stage by breaking up a singularly large turbulent stream through the discharging of finely divided streams from the mixing means into each of the unobstructed stages of the mixer apparatus.

Mixer 55 provides a device wherein the exothermic ammoniation reaction occurs with sufficient turbulence for mixing the reactants and for heat dissipation so that there is continuously produced stable liquid ammonium polyphosphate compositions. Through this utilization of mixer 55 to thoroughly mix constituents by the creation of turbulence, and to dissipate the high temperatures produced by the exothermic reaction, hydrolysis and the formation of mono and di-ammonium phosphates are prevented and consequently the desirable polyphosphate forms are preserved.

Mixer 55 can typically have a diameter of approximately six inches and a length of 5–8 feet; however, any number of stages may be contained in a reactor of any suitable length and diameter that will provide the thorough mixing and dispersion of the reactants, and the rapid dissipation of heat produced by the highly exothermic reaction. Usually mixer 55 has a substantially uniform cross-section and a length substantially in excess of the distance across a cross-section of the tubular body of mixer 55. A given portion of the quenched reaction mixture spends from 1 to 3 seconds, and typically 2 seconds, within mixer 55.

The product stream is transferred from mixer 55 to splitting tee 60 by pump 57 in conduit 56. At splitting tee 60, a sample stream in conduit 58 is split off from the remainder of the product stream in conduit 59. The sample stream is identical to the product stream in all of its chemical and physical properties and, after the adjustments described in the next two paragraphs, is similarly identical to the desired final stable aqueous ammonium polyphosphate composition. The sample stream passes successively through pH meter 61 and specific gravity meter 67 and joins the recycle stream in conduit 77 at mixing tee 79.

pH meter 61 continuously measures the sample stream pH and the measured pH generates a signal which is transmitted through conductor means 65 to metering pump 14 which adjusts the rate of flow of ammonia delivered to pipe reactor 30 in a predetermined relation to the pH of the sample stream and the desired final composition requirements.

Specific gravity meter 67 continuously monitors the specific gravity of the sample stream, and the measured specific gravity generates a signal which is transmitted through conductor means 70 to metering pump 52 which adjusts the rate of flow of water delivered to mixing tee 50 in a predetermined relation to the specific gravity of the sample stream and the desired final composition requirements.

The product stream in conduit 59 is cooled by cooler 75. Product can be drawn off from the product stream in conduit 59 through draw-off conduit 78 at splitting tee 76, and part or all of the final aqueous composition can be shunted into the recycle stream in conduit 77. All of the product stream in conduit 59 is shunted into conduit 77 until enough of the aqueous composition has been produced to make up the recycle stream. At that point, a portion of the recycle stream corresponding in flow rate to that of the reaction mixing exiting from mixer 50 is withdrawn through draw-off conduit 78 and transferred to storage. The portion drawn off is passed through cooler 85 where its temperature is lowered from about 130°F. to about 100°F. before it is transferred to storage.

Pipe reactor 30 is shown in FIG. 2 and provides for introduction of the acid through conduit 33 which is a 1-inch diameter and 13 ½ inch long cylindrical tube having one end 35 to which the conduit 26 (not shown) is attached and second end 37. Ammonia vapor is introduced through conduit 38 which is a 2-inch diameter cylindrical tube which is attached to conduit 33 at 36 through reducing section 40 and whose second end 42 extends 1 inch beyond end 37 of conduit 33 and which has an inlet tube 41 to which conduit 19 (not shown) is attached and through which ammonia is fed. The acid and ammonia flow from conduits 33 and 38, respectively, and enter conduit 45 which is a 4-inch diameter and approximately 46-inch long conduit which is joined to inlet conduit 38 at point 44 through flange 46 and which is joined through outlet 47 in end 48 to mixing tee 50 (not shown) through a series of concentric reducing and expanding sections (not shown).

In operation, pipe reactor 30 provides introduction of a stream of wet-process superphosphoric acid into the central region of an ammonia vapor stream. It has been found that corrosion of pipe reactor 30 due to the combination of the corrosiveness of wet-process superphosphoric acid and the high heat generated by the exothermic reaction between the acid and ammonia is minimized by introducing the acid into the central region of the stream of ammonia vapor and hence away from the walls of conduits 38 and 45. When, on the contrary, the ammonia was introduced in the central conduit 33 and the acid was introduced through outer concentric conduit 38, only 20 hours were required for the hot corrosive acid to eat through the walls of conduits 38 and 45. However, when the acid was introduced through conduit 33 and the ammonia was introduced through conduit 38, the acid did not eat through the walls of any of the conduits. Therefore, use of concentric streams of acid and ammonia vapor whereby the acid is introduced into the center of the ammonia vapor stream permits satisfactory mixing of the reactants and minimizes corrosion of the walls of the piping.

The average residence time of the reaction mixture in pipe reactor 30 is between 0.04 and 0.30 seconds depending on the flow rates of the acid and ammonia. The maximum flow rates allowable are the highest flow rates which will permit the necessary conversion of orthophosphate to polyphosphate within a short residence time within pipe reactor 30.

Due to the presence of $Fe_2O_3$ and $Al_2O_3$ as impurities in the wet-process superphosphoric acid feed, a scale of crystalline ($Fe^{+3}$, $Al^{+3}$) $NH_4P_2O_7$ builds up on the walls of pipe reactor 30 after a few hours of operation. The scale has the beneficial characteristic of further inhibiting corrosion of pipe reactor 30. However, with time, the buildup of scale can become large enough to prevent flow of the reaction mixture through pipe reactor 30. For this reason, pipe reactor 30 is replaced periodically to avoid blockage of the pipe reactor.

Table III is a listing of the typical operating conditions employed in the method of this invention. All piping including pipe reactor 30 through which acid feed flows is made of stainless steel, while all other piping is made of carbon steel.

TABLE III

Typical Pipe Reactor Operating Conditions

| Stream Description | Temperature, °F. | Pressure[a] | Flow Rate Volume[b] | Weight[c] | Conduit Diameter[d] |
|---|---|---|---|---|---|
| Ammonia in Conduit 12 | 60+ | 120 | 5.2 | 1.6 | ¾ |
| Ammonia in Conduit 19 | 190 | 115 | (80 cu. ft./min.) | 1.6 | 1¼ |
| Acid in Condiut 26 | 140 | 40 | 6.5 | 6.4 | 1½ |
| Reaction Mixture to Mixing Tee 50 Before Quench | 650 | 40 | — | 8.0 | 4 |
| Water in Conduit 51 | 50+ | 90 | 10.3 | 5.2 | 1 |
| Reaction Mixture Exiting Mixing Tee 50 | 290 | 40 | — | 13.2 | 4 to 2½ |
| Recycle Stream in Conduit 80 | 130 | 40 | 165 | 114 | 3 |
| Product Stream in Conduit 56 | 175 | 20 | 184 | 127.2 | 3 |
| Sample Stream in Conduit 58 | 175 | 80 | .5 | 3.5 | 1 |
| Product to Storage in Conduit 78 | 100 | 25 | 19.0 | 13.2 | 2 |

[a]Pounds per square inch
[b]Gallons per minute
[c]Thousand pounds per hour
[d]Inside diameter in inches

EXAMPLE I

The method of this invention was employed in a run to produce a stable aqueous ammonium polyphosphate composition having an N—P—K analysis of 10-34-0 using a wet-process superphosphoric acid feed containing 69.03% of $P_2O_5$ by weight and having 22.48% of its $P_2O_5$ content in the polyphosphate form.

A stream of wet-process superphosphoric acid flowing in conduit 26 at 5760 pounds per hour at 115°F. and at a pressure of 35 pounds per square inch and a stream of anhydrous ammonia vapor flowing in conduit 19 at 1440 pounds per hour at 190°F. and at a pressure of 50 pounds per square inch were introduced and mixed in pipe reactor 30. The average residence time of the acid-ammonia reaction mixture in pipe reactor 30 was 0.12 second. Water flowing in conduit 51 at 4680 pounds per hour at 50°F. and at a pressure of 95 pounds per square inch was introduced into mixing tee 50.

A recycle stream of the desired final stable aqueous ammonium polyphosphate composition flowing in conduit 80 at 114,000 pounds per hour at 70°F. and at a pressure of 25 pounds per square inch was introduced into mixer 55. pH and specific gravity measurements were made on a sample stream flowing in conduit 58 at 3500 pounds per hour at 115°F. and at a pressure of 70 pounds per square inch.

The final product drawn off in conduit 78 had an N—P—K analysis of 10.16-34.7-0, a pH of 5.95, and a specific gravity of 1.40; 55.3 percent of its $P_2O_5$ content was in the polyphosphate form.

The temperature of the recycle stream in conduit 80 was relatively low. This run was made in winter when the outdoor temperature was −20°F. Under these conditions, the efficiency of cooler 75 was unusually high.

What is claimed is:

1. An improved method for the continuous production of a stable aqueous ammonium polyphosphate composition comprising
    A. reacting in a pipe reactor wet-process superphosphoric acid, said acid being primarily in the orthophosphate form, and anhydrous ammonia vapor in an exothermic ammoniation to thereby ammoniate a portion of the acid and to dehydrate and convert a portion of the orthophosphate to polyphosphate in the pipe reactor by means of the heat generated by the exothermic ammoniation reaction by
        I. introducing the ammonia in the form of a single stream and exclusively into the pipe reactor and introducing the acid in the form of a single stream and exclusively into the pipe reactor along the axis of the pipe reactor and into the center of the stream of ammonia in the pipe reactor to thereby form the reaction mixture and to prevent corrosion of the pipe reactor by minimizing contact of the pipe reactor walls with the acid heated by the heat evolved in the ammoniation reaction, said streams containing the exact stoichiometric amounts of the acid and the ammonia that are required in the analysis desired for the final stable aqueous ammonium polyphosphate composition and said acid stream being introduced into said ammonia stream at a point downstream from where said ammonia stream is introduced into the pipe reactor;
        II. reducing the linear velocity of the combined ammonia and acid streams in the pipe reactor as they are being combined to form the reaction mixture in order to achieve efficient mixing of the combined streams within the pipe reactor; and
        III. allowing the temperature of the reaction mixture in the pipe reactor to increase in response to the heat liberated by the ammoniation reaction and without the addition or removal of heat by external means and thereby effecting the partial conversion of orthophosphate to polyphosphate in the pipe reactor;
    B. quenching the conversion reaction by removing the hot reaction mixture stream from the pipe reactor and adding to it a cooler stream consisting essentially of water, said water being at such a temperature as to lower the temperature of the reaction mixture enough to quench the conversion reaction and said water being added in the exact stoichiometric amount that is required in the analysis desired for the final stable aqueous ammonium polyphosphate composition; and
    C. completing rapidly the ammoniation reaction and the conversion of the reaction mixture stream to a reaction product stream in a reaction medium formed by next introducing the reaction mixture stream into a cooler stream of the desired final stable aqueous ammonium polyphosphate, said cooler stream being at such temperature as to lower the temperature of the reaction mixture below that at which loss of polyphosphate due to hydrolysis is significant;

wherein steps A, B, and C are performed in a completely closed system, thereby eliminating additional separation steps and losses of volatile components by volatilization.

2. The method of claim 1 wherein the step of reacting the acid and ammonia in the pipe reactor comprises additionally
    introducing the stream of acid into the pipe reactor at a constant flow rate;
    introducing the stream of ammonia into the pipe reactor at an adjustable flow rate;
    measuring the pH of the reaction product stream; and
    adjusting the flow rate of the stream of ammonia in a predetermined relation to the pH of the reaction product stream and the desired final composition requirements.

3. The method of claim 1 wherein the step of quenching the conversion reaction comprises additionally
    introducing the stream of water at an adjustable flow rate;
    measuring the specific gravity of the reaction product stream; and
    adjusting the flow rate of the stream of water in a predetermined relation to the specific gravity of the reaction product stream and the desired final composition requirements.

4. The method of claim 1 wherein the wet-process superphosphoric acid introduced into the pipe reactor contains from about 60 percent up to about 72 percent $P_2O_5$ by weight and sufficient orthophosphate is converted into polyphosphate in the pipe reactor so that at least 50 percent of the $P_2O_5$ content of the final aqueous ammonium polyphosphate composition is in the polyphosphate form.

5. The method of claim 1 comprising additionally
    cooling the reaction product stream;
    transferring a portion of the reaction product stream to storage, said portion corresponding in flow rate to that of the quenched reaction mixture stream which is continuously being combined with the cooler stream of the desired final stable aqueous ammonium polyphosphate; and
    transferring the remainder of the reaction product stream to a recycle stream and using it as the cooler stream of the desired final stable aqueous ammonium polyphosphate which is combined with the quenched reaction mixture stream.

6. The method of claim 5 wherein the step of reacting the acid and ammonia in the pipe reactor comprises additionally introducing the stream of acid into the pipe reactor at a constant flow rate;

introducing the stream of ammonia into the pipe reactor at an adjustable flow rate;

measuring the pH of the reaction product stream; and adjusting the flow rate of the stream of ammonia in a predetermined relation to the pH of the reaction product stream and the desired final composition requirements;

and wherein the step of quenching the conversion reaction comprises additionally introducing the stream of water at an adjustable flow rate;

measuring the specific gravity of the reaction product stream; and adjusting the flow rate of the stream of water in a predetermined relation to the specific gravity of the reaction product stream and the desired final composition requirements; and wherein the wet-process superphosphoric acid introduced into the pipe reactor contains from about 60 percent up to about 72 percent $P_2O_5$ by weight and sufficient orthophosphate is converted into polyphosphate in the pipe reactor so that at least 50 percent of the $P_2O_5$ content of the final aqueous ammonium polyphosphate composition is in the polyphosphate form.

* * * * *